Figure 1:
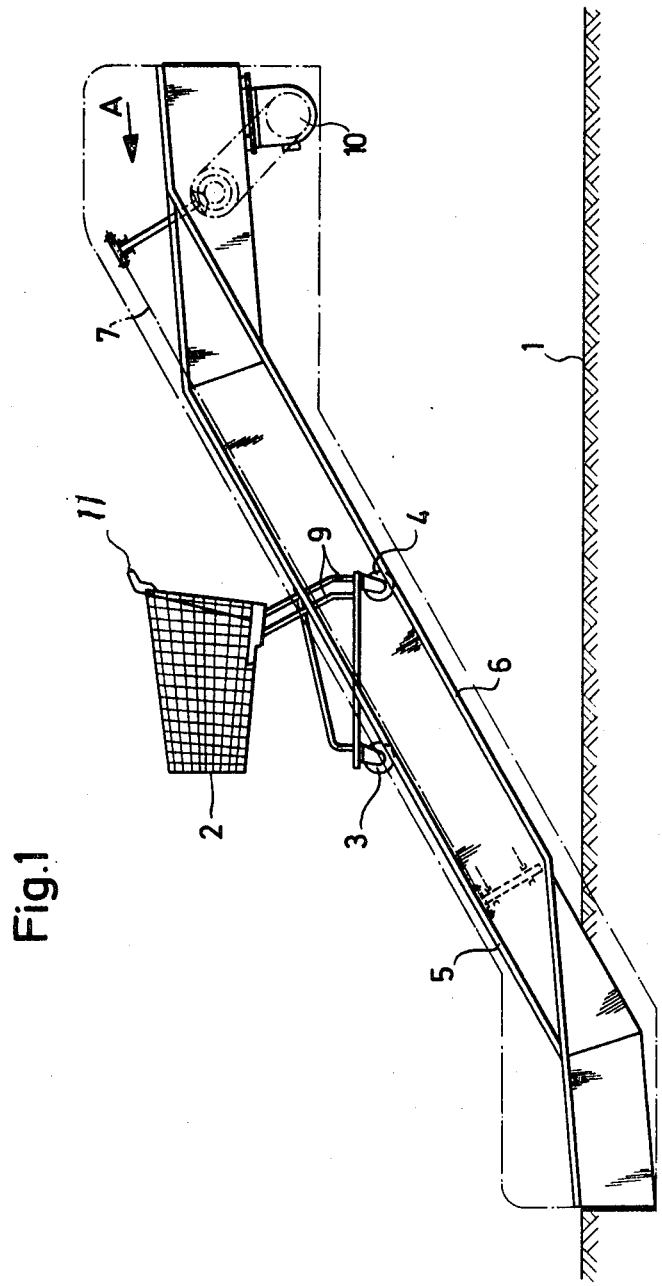

United States Patent
Weller

[15] 3,655,013
[45] Apr. 11, 1972

[54] CONVEYOR FOR SHOPPING CARTS
[72] Inventor: Wilhelm Weller, Linderhausen, Germany
[73] Assignee: Messrs. Transporttechnik GmbH, Gevelsberg, Germany
[22] Filed: Apr. 3, 1970
[21] Appl. No.: 25,508

[30] Foreign Application Priority Data
Apr. 18, 1969 Germany..................P 19 19 740.1

[52] U.S. Cl. ..........................................186/1 AC, 198/16 R
[51] Int. Cl.............................................................B65g 17/22
[58] Field of Search....................186/1 AC, 1 C; 198/16, 18, 198/131, 132, 16 R

[56] References Cited

UNITED STATES PATENTS

| 3,395,784 | 8/1968 | Kararek...............................198/134 X |
| 3,446,315 | 5/1969 | Close...................................186/1.1 C |

FOREIGN PATENTS OR APPLICATIONS

| 403,224 | 6/1966 | Switzerland..........................186/1.1 C |
| 1,249,765 | 9/1967 | Germany..............................186/1.1 C |

Primary Examiner—Joseph Wegbreit
Attorney—Watson, Cole, Grindle & Watson

[57] ABSTRACT

In a multifloor department store, floor-to-floor conveying means for customer carts comprising a pair of moving belts disposed laterally of the cart conveying path, grippers being carried by the belts to automatically engage the carts.

8 Claims, 2 Drawing Figures

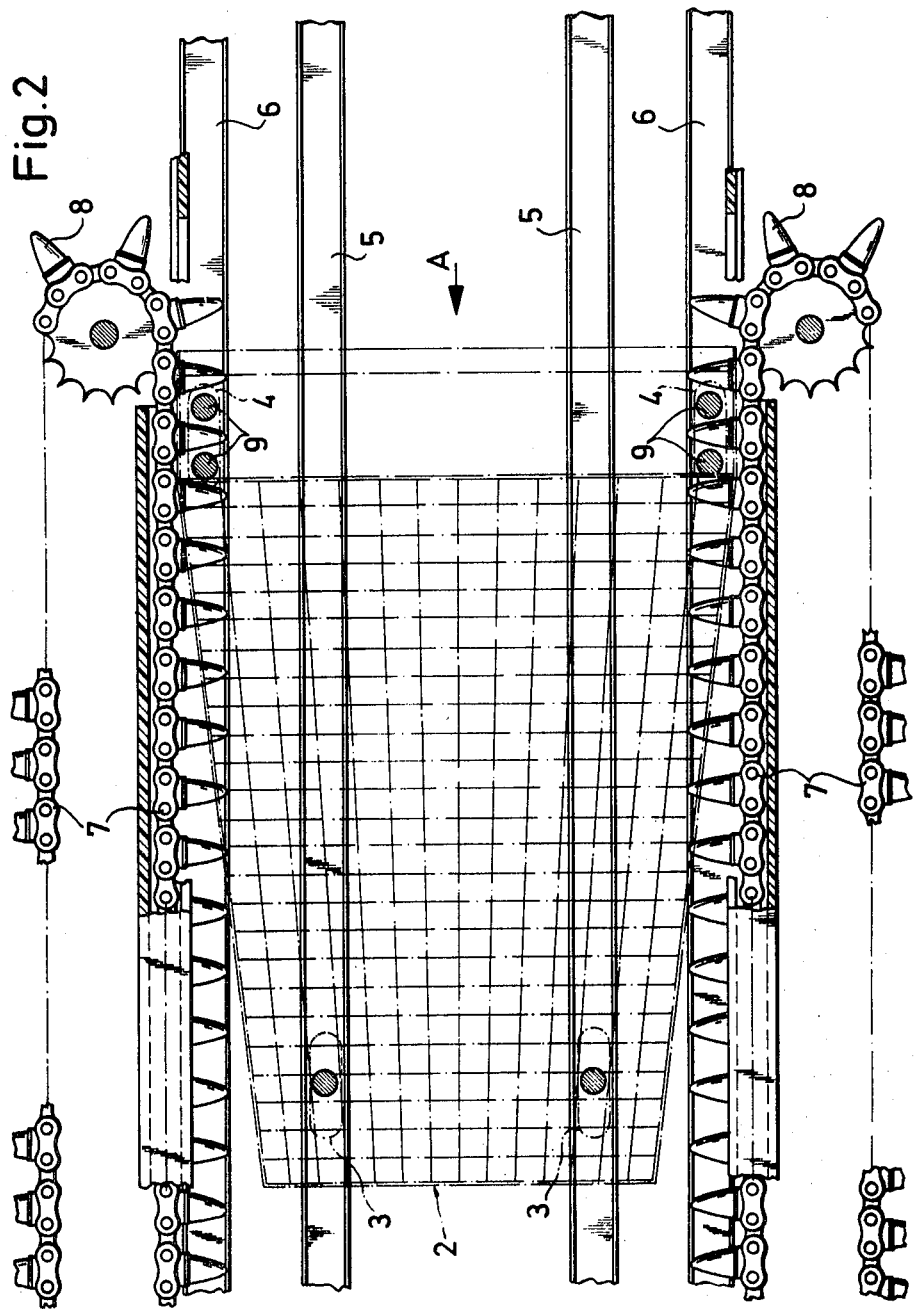

CONVEYOR FOR SHOPPING CARTS

The invention relates to conveying means for transport of shopping carriages or carts between different floors of multifloor department stores although the application of the invention is not limited to such purpose. The conveying means comprises conveyor chains or belts for conveying the carts upwardly or downwardly. The carriages which have a different track gauge for the front and rear wheels so that the conveying means are therefore being provided with one track each for the front and the rear wheels, and the tracks are disposed at different inclined levels, with the result that the carts maintain at least substantially their horizontal position during the conveyance along an inclined path or track.

Conveying means for this purpose comprise a vertically disposed chain or belt with engaging pieces which extend through a slot in the floor of an inlet gate through which the conveyor is accessible. The central arrangement of the chain, however, results in considerable drawbacks. First of all the central slot becomes clogged with liquids or dusty goods lost from damaged packages, as the result of the cart, for example, overturning, and has an overall tendency for becoming contaminated, thereby necessitating frequent cleaning. Further, it becomes quite risky for the cart during downward conveying because the cart can be moved in almost any direction in the inlet gate before the engaging pieces grip the cart whereby, very often, the cart will tumble down from the gate or track. Attempts have been made to prevent such accidents by providing of stop means for the cart which disengage therefrom upon arrival of the engaging member. Moreover, the engaging member extending through the floor and returning thereinto have frequently led to accidents in which customers were involved, particularly children.

It is therefore an object of the present invention to provide conveying means which avoid these drawbacks so that accidents are substantially prevented, and so that awkward handling of the carts will not involve the danger of tumbling the cart down the conveyor or stairs.

The conveyor according to the invention is characterized in that two conveyor chains or belts are provided laterally disposed in relation to the conveying path, said belts moving in synchronism and being provided with engagement pieces laterally engaging said carriages for transporting them therebetween. This carriage, once moved between the two chains or belts, will be immediately gripped by the engaging pieces facing each other, the engaging pieces or members preferably being in the form of rubber plugs and holding the carriage during the entire transporting procedure. At the end of the conveyor path, the cart will be released by swinging away from the rubber plugs so that the carriage may be pulled clear off the chains.

The plugs should be disposed in closely adjacent pitch so that any idling of the carts is prevented. Normally, the plugs will simply engage the vertical structure of the cart, thereby insuring the safe and aligned guiding of the latter.

Further objects of the invention will be apparent from the following description when considered in connection with the accompanying drawings in which;

FIG. 1 is a side elevational view of the conveying means according to the invention, and FIG. 2 is a top view of a portion of the structure conveying means of FIG. 1 on an enlarged scale.

Referring first to FIG. 1, numeral 1 designates the lower floor to which the shopping cart 2 is to be conveyed in an upstanding horizontal position. For this purpose, rolling tracks or rails 5 and 6 are provided for the front wheels 3 and rear wheels 4, respectively, the track gauge of the front wheels being smaller by design than that of the rear wheels. The transport of the cart 2 requires two laterally disposed endless conveyor chains 7 which are provided with engaging members in the form of rubber plugs or knobs 8. The endless conveyor chains 7 move continuously and in synchronism with each other so that each cart 2 introduced, for example, from the right-hand in the direction of arrow A, see FIG. 2, is gripped, by the oppositely facing plugs 8 as soon as the vertical structure bars 9 of the cart has been brought in the engagement range of the plugs 8. A relatively small pitch is chosen for the plugs, for example, 2 inches (=50 mm).

A conveyor of the type described has the advantages that a customer may simply move his cart into the guide means which are provided, shown in FIG. 2 but not designated with a reference number, and the customer may then release the handle 11 of the cart without any risk because the cart will automatically come in the gripping range of the rubber plugs or knobs 8 by means of the bars 9.

A common drive unit 10, FIG. 1 is provided for both the conveyor chains 7 so that they revolve and travel synchronously with the result that any inclination or tilting of the carts is prevented. IN order to obviate any danger of accidents, the chains are protected by housings made preferably of plastic material and provided with a narrow slot through which the engaging pieces may pass.

It will be understood that various modifications may be provided as to the embodiments shown and described without departing from the spirit of the invention. For example, the inner runs adjacent the conveying path of two belts may be provided with a surface suitable to act as engaging means in contact with the cart, a laterally applied force being exerted to said inner run to insure proper control of the movement. For this purpose, the inner run of the belt may be supported laterally by a spring loaded guide so that the inner chain runs, in their non-operative state, spaced from each other a distance smaller than the width of the cart at its level to be engaged. Upon insertion of the cart, the runs will be expanded so that the springs apply a suitably calculated engagement force to the belt runs in engagement with the cart.

I claim:

1. Conveying means for conveying upwardly and downwardly, respectively, shopping carts along conveying path from one floor to the other in stores or the like, having a multiplicity of floors, comprising tracks of different track gauge for front and rear wheels of the cart, said tracks being at different levels for said front and rear wheels, respectively, and conveyor means with engaging pieces, said conveyor means being disposed only laterally with respect to the conveying path, and said engaging pieces laterally engaging said carts for transporting them therebetween.

2. Conveying means according to claim 1, in which the conveyor means comprise endless belts looped about rollers, the axes of which are disposed substantially perpendicular with respect to the conveying path.

3. Conveying means according to claim 1, in which the conveyor means are provided with rubber plugs serving as nose clutches in engagement with the carts.

4. Conveying means according to claim 1, in which a housing is provided covering the entire conveying means and being provided with a slot through which the engagement elements extend.

5. Conveying means according to claim 1, in which the conveying means is in the form of a belt, the surface of which adjacent the cart to be conveyed being designed to act as engagement means when subjected to a force laterally applied to the belt in the direction of the conveying path.

6. In a multifloor building, means for floor-to-floor conveying of carts comprising inclined track means for guiding wheels of said carts along a conveying path, endless means being provided only laterally with respect to said path for engaging said carts with their inner runs to apply a controlled moving force thereto.

7. A trackway for sue between floors in a building comprising a double track for conveying carts from one floor to the other of the building, said track being set at least two different gages to accommodate at least two pairs of wheels of different widths relative to each pair, and means being provided only along the side of at least one track to engage and move the wheeled vehicles on the trackway.

8. A trackway according to claim 7, in which said means are provided on each side of the trackway adapted to engage and move the wheeled vehicles.

* * * * *